United States Patent [19]
Edelstein et al.

[11] 4,444,677
[45] Apr. 24, 1984

[54] GENERAL PURPOSE LIQUID SCINTILLATION COMPOSITION

[75] Inventors: Harold Edelstein, Fair Lawn; Daniel Koetters, Butler, both of N.J.

[73] Assignee: Allied Corporation, Morris Township, Morris County, N.J.

[21] Appl. No.: 444,967

[22] Filed: Nov. 29, 1982

[51] Int. Cl.³ ............................................. G01T 1/167
[52] U.S. Cl. ................................................ 252/301.17
[58] Field of Search .................................... 252/301.17

[56] References Cited

U.S. PATENT DOCUMENTS 3,939,094  2/1976  Kauffman ..................... 252/301.17

*Primary Examiner*—John F. Niebling
*Attorney, Agent, or Firm*—Webb, Burden, Robinson & Webb

[57] ABSTRACT

A general purpose scintillation cocktail comprises an aromatic liquid capable of capturing energy from radiation, at least one fluor compound, and a nonionic liquid surfactant comprised of polyethoxylated polyoxyethylene in which the weight percent of the polyoxyethylene in the molecule exceeds about 40 and in which the molecular weight of the polyoxypropylene portion of the molecule exceeds about 1450.

7 Claims, No Drawings

GENERAL PURPOSE LIQUID SCINTILLATION COMPOSITION

BACKGROUND

In scintillation counting, the radioactivity of alpha, beta, gamma, and X-ray emitters is detected and thereby the concentration of the emitters. Liquid scintillation counting comprises the addition of a specimen that emits nuclear radiation to an organic liquid mixture which in turn emits light when intercepting the radiation. The flash of light is detected, for example, by a photocell which is in a circuit that counts the flashes. The organic liquid mixture is often called a "scintillation cocktail." Generally it is comprised of an aromatic solvent for capturing the energy of the radiation, primary and secondary fluors for converting the energy to a light flash and surfactants to enable the intimate admixture of the cocktail with the specimen. See U.S. Pat. Nos. 3,939,094 and 4,124,527 for general background.

A scintillation cocktail must provide a very high degree of efficiency (number of flashes detected for number of radiated particles) for the condition under which it is to be used. Since, the amount of radio-tagged specimen is usually very small, great concern must be given to the efficiency of a scintillation cocktail when the concentration of the specimen in the cocktail is very low, say two milliliters or less of specimen per eight milliliters of cocktail.

U.S. Pat. No. 3,939,094 contains teaching regarding liquid scintillation cocktails containing mixtures of polyethoxylated polyoxypropylene surfactants and teachings regarding liquid scintillation cocktails containing a single polyethoxylated polyoxypropylene surfactant. It is specifically taught that for single surfactant-type cocktails, the polyethoxylated polyoxypropylene materials should have about 32 to 40 polyoxypropylene groups or less desirably 18 to 25 polyoxypropylene groups and comprise 10 to 30 percent by weight polyoxyethylene. The preferred surfactant comprises Pluronic L72 with Pluronic L42 being somewhat less preferred and both being considered superior to Pluronic L62.

Surprisingly, the applicants have found that for very small sample specimen quantities, superior liquid scintillation cocktails can be batched using a single polyethoxylated polyoxypropylene surfactant that is not one of those taught to be preferred or even acceptable when used by itself in U.S. Pat. No. 3,939,094.

SUMMARY OF THE INVENTION

This invention relates to a general purpose scintillation cocktail for aqueous samples. It does not have the disadvantage of certain prior art scintillation cocktails that separate into two phases reducing the degree of energy transferred from the radioactive species to the fluors.

Briefly according to this invention, there is provided a general purpose scintillation cocktail comprising an aromatic liquid capable of capturing energy from radiation, at least one fluor compound, and a nonionic surfactant liquid at ambient temperature (25° C.) comprising polyethoxylated polyoxypropylene in which the weight percent of polyoxyethylene is equal to or exceeds about 40 and in which the molecular weight of the polyoxypropylene portion of the surfactant exceeds about 1450 (25 groups). Preferably, the molecular weight of the polyoxypropylene portion exceeds 1600 (27 groups), for example, 1750 (30 groups). As the molecular weight of the surfactant increases, it changes from a liquid surfactant to a paste or solid at 25° C. Pastes and solid surfactants are not part of this invention. The aromatic liquid may be pseudocumene, mesitylene or xylene or toluene. Preferably the aromatic liquid is pseudocumene. The primary fluor may be selected from PPO and butyl-PBD; preferably PPO. The secondary fluor may be bis-MSB, POPOP or DMPOPOP; preferably bis-MSB. The nonionic liquid surfactant is preferably a product sold under the trademark Pluronic L64.

The aromatic liquid typically comprises 60 to 70 parts by weight of the cocktail. The fluors less than about 1 part by weight of the cocktail, and the nonionic liquid surfactant between 30 and 40 parts by weight of the cocktail.

DESCRIPTION OF THE PREFERRED EMBODIMENT

According to a preferred embodiment, a scintillation cocktail was prepared from the following batch: 330 gallons of pseudocumene, 20 pounds 11 ounces of PPO, 1875 grams bis-MSB, 1375 pounds Pluronic L64.

The cocktail was mixed in a glass lined tank at room temperature and passed through a 40 micron glass filter.

By way of comparison, a number of scintillation cocktails were prepared or obtained from commercial sources and tested along with the preferred embodiment described above. In the case of prepared comparative cocktails, they were prepared by mixing the ingredients at room temperature in a glass lined or stainless steel container.

Comparative cocktails C2, C3, C4 and C5 had compositions identical with the preferred cocktail except that the liquid ionic surfactant was replaced by Pluronic L63, Pluronic L62, Pluronic L44, and Pluronic L42 respectively. The commercial cocktail C6 is known to have good efficiency.

The cocktails were then mixed in various proportions with aqueous solvent mixtures. The mixtures were spiked with a $^3$H-spike of known activity (enabling the later calculation of a counting efficiency). The cocktails were then placed in a liquid scintillation counting apparatus and the counting efficiencies were measured and calculated.

The counting efficiencies at one or two different specimen/cocktail ratios for the preferred cocktail and the five comparative cocktails are set forth in Table I. The specimen comprised pure water with the $^3$H-spike.

TABLE I

| Cocktail | 2 ml H$_2$O/ 10 ml cocktail | 1 ml H$_2$O/ 10 ml cocktail |
| --- | --- | --- |
| Preferred Cocktail (with Pluronic L64) | 31.1% | 34.7% |
| C2 (with Pluronic L63) | 27.2 | 31.7 |
| C3 (with Pluronic L62) | 29.3 | 32.4 |
| C4 (with Pluronic L44) | 17.1 | 22.6 |
| C5 (with Pluronic L42) | 17.2 | 36.3 |
| C6 (commercial) | 30.4 | 32 |

Table IA supplements Table I by setting forth a chemical description of the liquid surfactants sold under the Pluronic trademark.

TABLE 1A

| Type | Molecular weight by poly-(oxypropylene) portion | Weight percent poly-(oxyethylene) portion in entire molecule |
| --- | --- | --- |
| Pluronic L64 | 1750 | 40% |
| Pluronic L63 | 1750 | 30 |
| Pluronic L62 | 1750 | 20 |
| Pluronic L44 | 1200 | 40 |
| Pluronic L42 | 1200 | 20 |

Table I establishes that the selection of the polyethoxy polyoxypropylene surfactant is critical for best counting efficiency. When the amount of polyoxyethylene in the surfactant was reduced from 40 to 30 to 20 weight percent the counting efficiency dropped (compare the preferred cocktail with C2 and C3). When the amount of polyoxypropylene was reduced from a molecular weight of 1750 to 1200, the counting efficiency dropped (compare preferred cocktail with C4 and C5). Pluronic L44 is suggested as one of the preferred polyethoxy polyoxypropylene surfactants in the above noted prior art patent. The preferred cocktail according to this invention is clearly superior to the experimental variations. The preferred cocktail is also superior to the commercial cocktail believed to contain polyethoxy polyoxypropylene surfactant.

Table II sets forth counting efficiencies for the preferred cocktail with data for the best two of five commercial cocktails tested wherein the solvent was a five percent dextrose solution in water. The counting efficiencies were obtained at three concentration levels.

TABLE II

| Cocktail | 0.5 ml sample/ 10 ml cocktail | 1 ml sample/ 10 ml cocktail | 2 ml sample/ 10 ml cocktail |
| --- | --- | --- | --- |
| Preferred Cocktail | 39.4% | 34.6% | 27.2% |
| Cocktail C7 | 31.1% | 28.9% | 22.3% |
| Coctail C8 | 29.3% | 27.5% | 26.2% |

Table III sets forth the data for counting efficiency of the preferred cocktail with data for the best two of five commercial cocktails tested wherein the solvent was 0.9% salt in water. The counting efficiencies were obtained at three different concentration levels.

TABLE III

| Cocktail | 0.5 ml sample/ 10 ml cocktail | 1 ml sample/ 10 ml cocktail | 2 ml sample/ 10 ml cocktail |
| --- | --- | --- | --- |
| Preferred Cocktail | 39.2% | 34.1% | 29.9% |
| Cocktail C6 | 33.7% | 31.4% | 29.7% |
| Cocktail C7 | 32.2% | 28.5% | 24.1% |

Table IV sets forth data for counting efficiency of the preferred cocktail with a solvent comprising three percent TCA (trichloroacetic acid) and for the two best of five commercial cocktails. The counting efficiencies were detected at three concentration levels.

TABLE IV

| Cocktail | 0.5 ml sample/ 10 ml cocktail | 1 ml sample 10 ml cocktail | 2 ml sample/ 10 ml cocktail |
| --- | --- | --- | --- |
| Preferred Cocktail | 35.9% | 30.3% | 24.7% |
| Cocktail C6 | 32.3% | 28.7% | 23.2% |
| Cocktail C7 | 30.4% | 25.5% | 17.1% |

Table V sets forth data for counting efficiencies of the preferred cocktail with a solvent comprising 2.8 percent $NaHCO_3$ and for the two best of five commercial cocktails. The efficiencies were detected at three different concentrations.

TABLE V

| Cocktail | 0.5 ml sample/ 10 ml cocktail | 1 ml sample/ 10 ml cocktail | 2 ml sample/ 10 ml cocktail |
| --- | --- | --- | --- |
| Preferred Coctail | 38.7% | 34.1% | 28.6% |
| Cocktail C6 | 33.3% | 30.8% | 26.4% |
| Cocktail C7 | 32.5% | 29.1% | 22.6% |

For each of the aqueous solvents considered and at the low concentrations of interest, the preferred cocktail had superior counting efficiency.

The phosphorescent aromatic compounds capable of capturing energy from radiation from radio-tagged compositions are known in the art and include the following:

| Benzene | $C_6H_6$ |
| --- | --- |
| Toluene | $C_6H_5CH_3$ |
| O—Xylene | $1,2\text{-}C_6H_4(CH_3)_2$ |
| M—Xylene | $1,3\text{-}C_6H_4(CH_3)_2$ |
| P—Xylene | $1,4\text{-}C_6H_4(CH_3)_2$ |
| Pseudocumene | $1,2,4\text{-}C_6H_3(CH_3)_3$ |
| Mesitylene | $1,3,5\text{-}C_6H_3(CH_3)_3$ |

The fluors (which serve to shift the wave length of emitted light to that to which the photocells are most sensitive) are known in the art and include the following:

| PPO | 2,5-diphenyloxazole |
| --- | --- |
| PBD | 2-Phenyl-5-(4-Biphenyl)-1,3,4-Oxadiazole |
| PTP | p-terphenyl |
| Bis-MSB | 1,4-bis-(o-methyl styryl) benzene |
| POPOP | 1,4-bis-2-(5-Phenyloxazolyl)-Benzene |
| Dimethyl POPOP | 1,4-bis-2-(4-Methyl-5 Phenyloxazolyl)-Benzene |

Having thus described the invention with the detail and particularity required by the Patent Laws, what is desired protected by Letters Patent is set forth in the following claims:

1. A general purpose scintillation cocktail comprising:
    (a) an aromatic liquid capable of capturing energy from radiation,
    (b) at least one fluor compound, and
    (c) a nonionic liquid surfactant comprised of polyethoxylated polyoxypropylene in which the weight percent of the polyoxyethylene in the molecule exceeds about 40 and in which the molecular weight of the polyoxypropylene portion of the molecule exceeds about 1450.

2. The scintillation cocktail according to claim 1 wherein the aromatic liquid comprises between 60 and 70 parts by weight, the fluor compound less than 1 part by weight and the liquid surfactant between 40 and 30 parts by weight, all parts based on the weight of the entire batch.

3. The scintillation cocktail according to claim 2 wherein the aromatic liquid is selected from the group pseudocumene, mesitylene, xylene and toluene.

4. The scintillation cocktail according to claim 3 wherein the fluors are selected from the group PPO and butyl-PBD.

5. The scintillation cocktail according to claim 4 wherein a secondary fluor is added and selected from the group bis-MSB, POPOP and DMPOPOP.

6. The scintillation cocktail according to claim 2 wherein the liquid surfactant comprises a polyoxypropylene portion having a molecular weight exceeding 1600.

7. The scintillation cocktail according to claim 2 wherein the aromatic liquid comprises pseudocumene, the fluor comprises PPO and a secondary fluor being bis-MSB, and the liquid surfactant comprises a polyethoxylated polyoxypropylene having a poly(oxypropylene) portion with a molecular weight of about 1750 and a poly(oxyethylene) portion being about 40 percent by weight of the entire surfactant molecule.

* * * * *